US012754043B2

(12) United States Patent
Painter et al.

(10) Patent No.: US 12,754,043 B2
(45) Date of Patent: Oct. 6, 2026

(54) IN-SITU CAPACITANCE DETECTION FOR INTEGRATED CIRCUITS AND MEMS SENSORS

(71) Applicant: Apple Inc., Cupertino, CA (US)

(72) Inventors: Christopher C. Painter, Dublin, CA (US); Qinghung Lee, Monte Sereno, CA (US); See-Ho Tsang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 144 days.

(21) Appl. No.: 18/670,088

(22) Filed: May 21, 2024

(65) Prior Publication Data

US 2026/0036441 A1 Feb. 5, 2026

Related U.S. Application Data

(60) Provisional application No. 63/526,605, filed on Jul. 13, 2023.

(51) Int. Cl.
*G01D 5/24* (2006.01)
*G01P 15/125* (2006.01)

(52) U.S. Cl.
CPC .............. *G01D 5/24* (2013.01); *G01P 15/125* (2013.01)

(58) Field of Classification Search
CPC ..... H01L 2924/1461; H01L 2924/3011; H01L 2924/181
See application file for complete search history.

(56) References Cited

U.S. PATENT DOCUMENTS

| | | | | |
|---|---|---|---|---|
| 4,224,565 | A | 9/1980 | Sosniak et al. | |
| 8,111,108 | B2 * | 2/2012 | Gaidarzhy | H03H 9/02338 331/177 R |
| 11,248,977 | B2 | 2/2022 | Kuisma | |
| 11,972,988 | B2 | 4/2024 | Beinert et al. | |
| 2005/0270014 | A1 * | 12/2005 | Zribi | G01R 33/0286 324/126 |
| 2009/0014653 | A1 * | 1/2009 | Parrish | H04N 25/76 250/252.1 |
| 2014/0062590 | A1 * | 3/2014 | Khlat | H03F 1/0227 330/127 |
| 2017/0090673 | A1 * | 3/2017 | Kim | G06F 3/0418 |

(Continued)

*Primary Examiner* — Huy Q Phan
*Assistant Examiner* — Temilade S Rhodes-Vivour
(74) *Attorney, Agent, or Firm* — Brownstein Hyatt Farber Schreck, LLP

(57) ABSTRACT

Disclosed herein are electronic sensor systems and methods of their operation. The electronic sensor systems contain a micro-electromechanical system (MEMS) for measuring a physical parameter such as rotation, pressure, acceleration, or another physical parameter. The electronic sensor systems also contain an integrated circuit linked with the MEMS. The integrated circuit contains a MEMS sensing circuit that receives outputs from the MEMS through conductors, such as wire bonds or ball joints, at least partially encapsulated in a dielectric. The dielectric may experience environmentally-induced changes to its dielectric constant that may affect a capacitance between a pair of the conductors, which can affect a measurement provided by the MEMS. The integrated circuit contains a compensation circuit that measures a capacitance between a pair of the conductors and provides an adjustment to a measurement provided by the MEMS.

19 Claims, 11 Drawing Sheets

(56) References Cited

U.S. PATENT DOCUMENTS

| | | | | |
|---|---|---|---|---|
| 2017/0285061 | A1* | 10/2017 | Tocchio | G01P 15/125 |
| 2018/0090928 | A1* | 3/2018 | Bach | G01R 19/16585 |
| 2021/0028076 | A1 | 1/2021 | Beinert et al. | |

* cited by examiner

IN-SITU CAPACITANCE DETECTION FOR INTEGRATED CIRCUITS AND MEMS SENSORS

CROSS-REFERENCE TO RELATED APPLICATION

This application is a nonprovisional and claims the benefit under 35 U.S.C. § 1.119(e) of U.S. Provisional Patent Application No. 63/526,605, filed Jul. 13, 2023, the contents of which are incorporated herein by reference as if fully disclosed herein.

FIELD

The present disclosure generally relates to compensating for errors in measurements acquired from a physical parameter sensor. In some embodiments, the physical parameter sensor may be, or includes a micro-electromechanical system (MEMS) that defines a rotation sensor, a pressure sensor, an acceleration sensor, or another form of physical parameter sensor.

BACKGROUND

Electronic devices may be, or include a MEMS that can be used to detect, or measure, a physical parameter. As examples, the physical parameter may be acceleration, rotation, or pressure. In some cases, the MEMS may be provided in a MEMS die and/or packaged in a first package. In some cases, the MEMS may be connected to a MEMS controller or other circuitry. The MEMS controller or other circuitry may be provided in an integrated circuit die and/or packaged in a second package. The integrated circuit die may be distinct from the MEMS or MEMS die, and the second package may be distinct from the first package. Various conductors (e.g., electrical contacts, wire bonds, conductive bumps (e.g., solder bumps), vias) may electrically connect the MEMS or MEMS die to the MEMS controller or other circuitry. In some cases, a dielectric may be deposited around the conductors, die, or packages in an uncured form, and then cured, to partially or fully encapsulate some or all of these elements and protect them from accidental damage, fluid exposure, or other environmental effects.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Over time, or under particular environmental conditions, the dielectric deposited around the conductors, die, or package(s) of an electronic device may experience physical deformation, such as warping, bending, or stretching. One cause of deformation may be the effects of temperature or humidity (e.g., moisture absorption) induced mechanical stress. Such deformation may alter the structure or operation of a MEMS and/or introduce errors into the signal output of a MEMS. As one example, consider a pressure sensor in which the warping of a dielectric that encapsulates a set of conductors (e.g., a set of conductors that connect a MEMS to a controller) changes the geometry of (e.g., a distance between) the conductors, thereby introducing a change in the capacitive coupling between the conductors. Additionally or alternatively, humidity may change the dielectric constant of the dielectric, thereby introducing a change in the capacitive coupling between the conductors. As another example, consider a MEMS housed in a package that is bent or flexed as a result of warpage of an encapsulating dielectric. The bending of the package may change the geometry of, or spacing between, one or more components of the MEMS, thereby altering a signal output of the MEMS.

Described herein are electronic sensor systems that include a MEMS and a controller that are electrically connected by means of various conductors. Also described herein are methods of operating the MEMS and controller to compensate for changes in parameters of the MEMS (e.g., due to warpage of a dielectric or other components) and/or changes in capacitance between the conductors that connect the MEMS and the controller (e.g., due to warpage or change in the dielectric constant of a dielectric that surrounds and at least partially encapsulates the conductors).

In some aspects, an electronic sensor system is described. The electronic sensor system may include a MEMS die; an integrated circuit die containing a MEMS sensing circuit and an environmental factor compensation circuit; a first set of conductors configured to carry signals from the MEMS die to the MEMS sensing circuit; a second set of conductors having a same construction as the first set of conductors and coupled to the environmental factor compensation circuit; and a dielectric at least partially encapsulating the first set of conductors and the second set of conductors. The environmental factor compensation circuit may be configured to infer a capacitance between conductors of the second set of conductors and provide a measurement compensation value to the MEMS sensing circuit.

In some embodiments, the second set of conductors may be electrically isolated from the MEMS. In some embodiments, the environmental factor compensation circuit may measure the capacitance between a pair of conductors in the second set of conductors. The environmental factor compensation circuit may measure the capacitance using a feedback oscillator circuit, either with or without applying a signal to the pair of conductors.

In some aspects, another electronic sensor system is described. The electronic sensor system may include a MEMS die having a pair of conductors at least partially encapsulated in a dielectric. The pair of conductors may extend to an exterior surface of the MEMS die. The electronic sensor system may also include a MEMS controller that is electrically connected with the pair of conductors. The MEMS controller may include a MEMS sensing circuit operable to apply an input signal to the MEMS die and receive an output signal from the MEMS die. The MEMS controller may also include an environmental factor compensation circuit configured to infer a capacitance between the pair of conductors. The environmental factor compensation circuit may be configured to provide a measurement compensation value to the MEMS sensing circuit based on the inferred capacitance between the pair of conductors.

In other aspects, a method of controlling an electronic sensor system is described. The electronic sensor system may include a MEMS having a first set of conductors that is at least partially encapsulated in a dielectric and conductively connected to a second set of conductors of an integrated circuit. The method may include determining that an output value of the MEMS is to be obtained; selecting a first pair of conductors of the first set of conductors; measuring a capacitance between the first pair of conductors using an environmental factor compensation component of the integrated circuit; and estimating an adjustment value for the output value of the MEMS based at least in part on the measured capacitance.

BRIEF DESCRIPTION OF THE DRAWINGS

The disclosure will be readily understood by the following detailed description in conjunction with the accompanying drawings, wherein like reference numerals designate like structural elements.

Figure 1A:
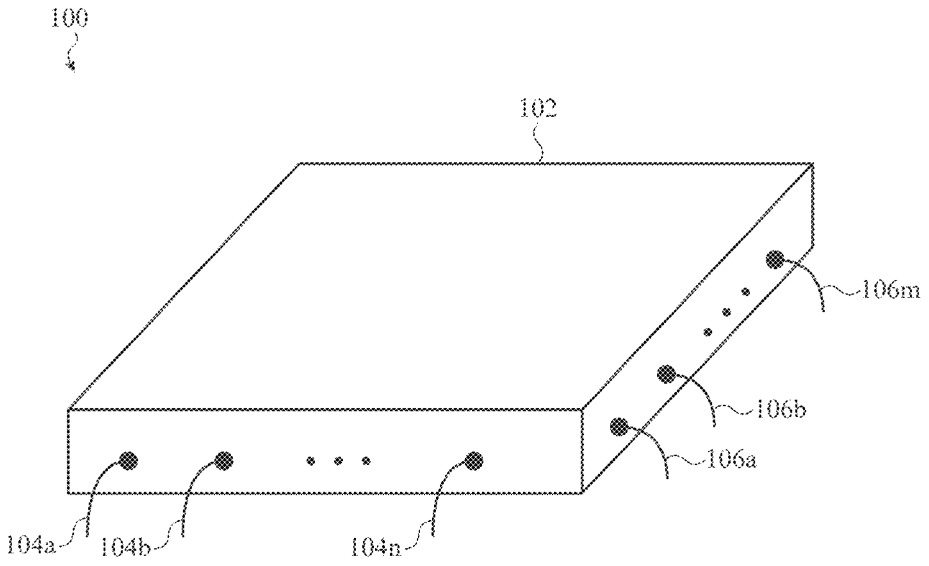
FIG. 1A illustrates an example electronic device that may be fully or partially contained within an enclosure, according to an embodiment.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to electronic devices that include both a physical parameter sensor system, and an electronic control circuit (e.g., a controller provided in an integrated circuit) that is electrically connected to the physical parameter sensor system. The controller may be configured to receive signals from, and apply signals to, the physical parameter sensor system. Such electronic devices will be referred to herein as electronic sensor systems.

The physical parameter sensor system may be or include a MEMS, such as a rotation sensor, an accelerometer, a pressure sensor, or another sensor that measures a physical parameter such as motion, velocity, acceleration, displacement, pressure, or temperature. Hereinafter, any section, subsystem, or component of an electronic device containing one or more electronic circuit elements (including, but not limited to, transistors, resistors, capacitors, processors, among others) as well as one or more mechanical components (including, but not limited to, pressure transducers, piezoelectric or piezomagnetic components, and reference masses of accelerometers or rotation sensors) for measurement of a physical parameter will be referred to as a MEMS. A MEMS may be a single, enclosed component of an electronic sensor system, or may be electrically connected to a controller or section of an electronic sensor system.

A MEMS may include or be electrically connected to electrically conductive connections such as wire bonds, ball bumps, vias, electrical contacts, or electrical connections (collectively referred to as "conductors") that may be at least partially encapsulated in a dielectric material (often referred to herein as just a "dielectric"). One example of such a dielectric is polyimide. At least some of the conductors provided by, or connected to, a MEMS may be positioned at or in close proximity to an exterior surface of the MEMS, to enable the MEMS to be electrically connected to other circuitry or sections of an electronic sensor system. A close proximity of conductive leads or other conductors may introduce an additional, parasitic, or coupling capacitance in the electronic sensor system. In cases where the MEMS measures a physical parameter and produces an analog output signal that is to be routed to off-chip circuitry, this capacitance has an effect on the output signal. If the capacitance is stable, or if the capacitance can be measured or estimated for a particular operating environment in which the electronic sensor system will be used, the capacitance may be accounted for in the design, manufacture, or factory calibration of the electronic sensor system, so that a correct value of the physical parameter is conveyed by the output signal.

However, physical changes in the electronic sensor system may occur after manufacture and alter the value of the coupling capacitance between conductors. A first example of such a change is a deformation of the MEMS or another component of the electronic sensor system that causes the geometry of (e.g., distance between) the conductors to change, altering the capacitance. The deformation may be caused by temperature, humidity, a physical impact or mechanical stress, or other environmental condition. A second example of such a change is the absorption of humidity (moisture) by a dielectric that fully or partially encapsulates the conductors. Absorbed humidity may cause a warping or bending of the dielectric or even the MEMS, changing the geometry—and thus the capacitance—between the conductors. The absorbed humidity may also alter the dielectric constant of the dielectric that encapsulates the conductors, which also alters the coupling capacitance between the conductors.

In some cases, the altered value of the capacitance may not be directly measurable. For example, the MEMS, or the MEMS together with its controller, may be encased in a sealed package or substantially or fully encapsulated in the dielectric. It may be that the only access to, or connection with, the MEMS is through the conductors exposed or attached to its external surface.

Various embodiments described herein are directed to structures, components, and methods for measuring or estimating changes in capacitance between conductors of a MEMS and compensating for the changes in the operation of an electronic sensor system. In a first family of embodiments, one or more MEMS of an electronic sensor system may be electrically connected to an integrated circuit (e.g., an integrated circuit die, package, or printed circuit board (PCB)) containing circuitry for controlling and/or interfacing with the MEMS. A set of electrical contacts of the MEMS may be electrically connected to a set of electrical contacts on the integrated circuit. A feedback oscillator provided by the integrated circuit may electrically connect to a pair of conductors associated with the MEMS. The capacitance between the pair of conductors of the MEMS may be estimated by the output frequency of the feedback oscillator, or by another parameter or method. The pair of conductors associated with the MEMS may be a "dummy" pair of conductors, which have the same construction and geometry as other conductors of the MEMS, but which are electrically isolated from the mission electronics of the MEMS. In a variation, an AC voltage signal (e.g., a square wave) may be generated and applied to one of the selected pair of conductors.

In a second family of embodiments, a MEMS and a MEMS controller of an electronic sensor system may be separately implemented, packaged, or encased and electrically connected through conductors such as ball bumps. The controller of the electronic sensor system may estimate the capacitance between a pair of the connecting conductors by use of a feedback oscillator, as previously described.

A third family of embodiments describes methods of operation for electronic sensor systems. The methods may be used to determine the capacitance between a pair of conductors associated with a MEMS. The method applies a measurement process, such as use of a feedback oscillator applied across the pair of conductors, to estimate a current value (and possibly changed value) of a coupling capacitance.

The estimate for a possibly changed capacitance between conductors may be used by an electronic sensor system to produce an adjusted output value for a measured physical parameter.

These and other embodiments are discussed below with reference to FIGS. 1A-8. However, those skilled in the art will readily appreciate that the detailed description given herein with respect to these figures is for explanatory purposes only and should not be construed as limiting.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

FIG. 1A illustrates an example electronic device 100 that may be fully or partially contained within package or enclosure 102. The enclosure 102 may be a dielectric, such as an injected molding material that has cured to a rigid shape. Alternatively, the enclosure 102 may be an electronic package, a dielectric protective layer, such as silicon dioxide or other material, on an integrated circuit chip, or another enclosure or encapsulating material or structure. The electronic device 100 has electronic connections (e.g., wire bonds) 104*a-n* on a first side, and additional electronic contacts 106*a-m* on a second side. FIG. 1A is for illustration purposes only. One skilled in the art will recognize that an electronic device may be associated with connections or leads on one side, on opposite sides of a rectangular shape, on all sides, on a top or bottom surface, or in another configurations. The electrical contacts 104*a-n* and 106*a-m* may be formed of a conductive material, and may serve either to transmit or receive electrical signals from one or more other devices or components, by being electrically connected (such as by soldering) to electrical contacts or leads (such as conductive contact pads) associated with the other device(s). Though shown with a wire geometry, in various embodiments the electrical contacts 104*a-n* and 106*a-m* of the electronic device 100 may have other geometries or configurations, such as conductive strips or conductive ball bumps.

Figure 1B:
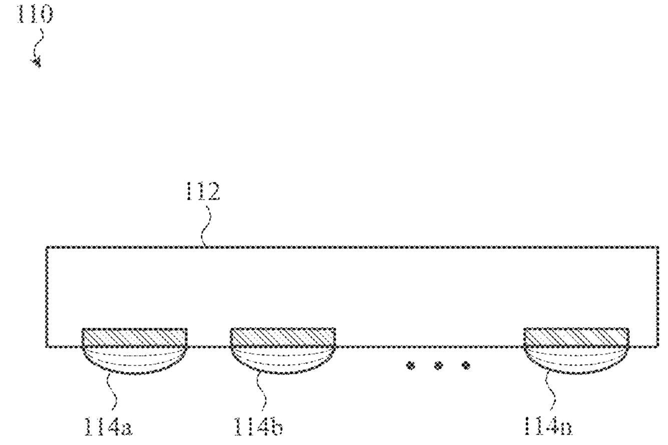
FIG. 1B illustrates a side view of another example electronic device, according to an embodiment.

FIG. 1B shows a side view of an exterior surface of an electronic device 110, either fully or partially contained within a package or enclosure 112. The enclosure 112 may be configured as described with reference to the enclosure of FIG. 1A. The electronic device 110 may have ball bumps 114*a-n*, which may be formed from a conductive material and be attached to electrical contacts on a base side of the enclosure 112. The ball bumps 114*a-n* may function to electrically connect electronic circuit components of the electronic device 110, housed within the enclosure 112, to other components of an electrical system or device that includes the electronic device 110.

The electronic devices 100 and 110 may contain various components, such as one or more MEMS and, in some cases, one or more integrated circuits or discrete circuit elements. Examples of MEMS include rotation sensors, gyroscopes, pressure sensors, accelerometers, or other sensors. Protective material, such as a dielectric (e.g., a dielectric molding material), may fully or partially encapsulate the various components of the electronic device. Electronic devices that include a MEMS will be referred to herein as electronic sensor systems.

Figure 2A:
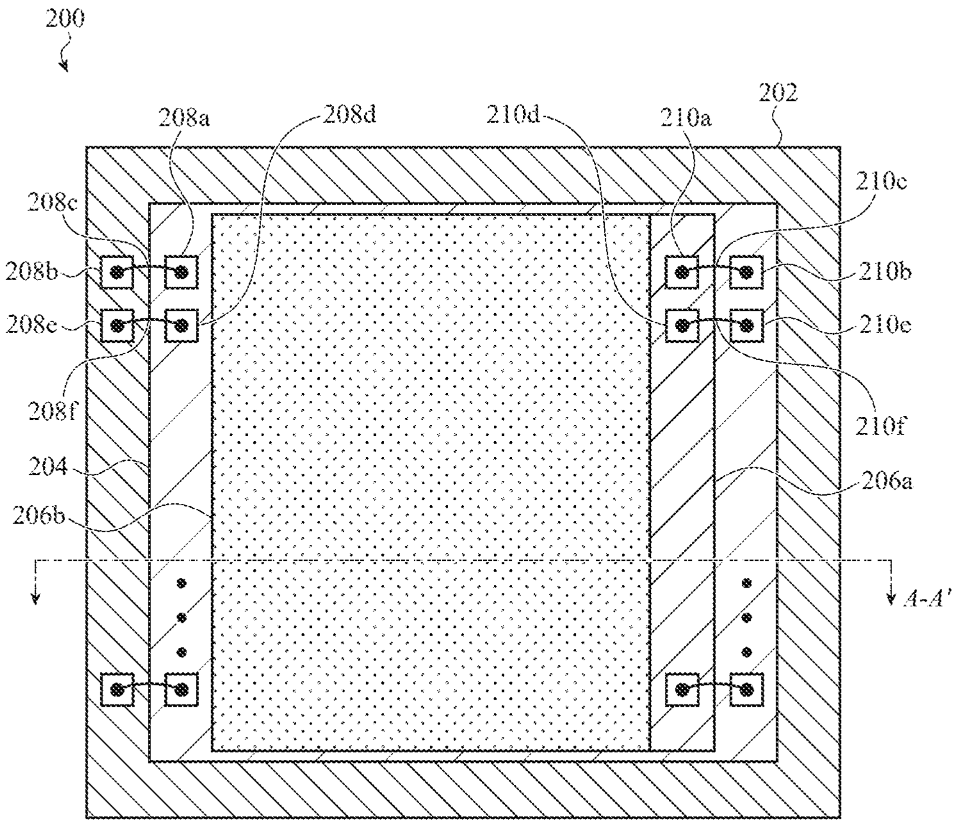
FIG. 2A illustrates a top view of an example electronic sensor system that includes a MEMS die and an integrated circuit die, electrically connected by conductors, according to an embodiment.
Figure 2B:
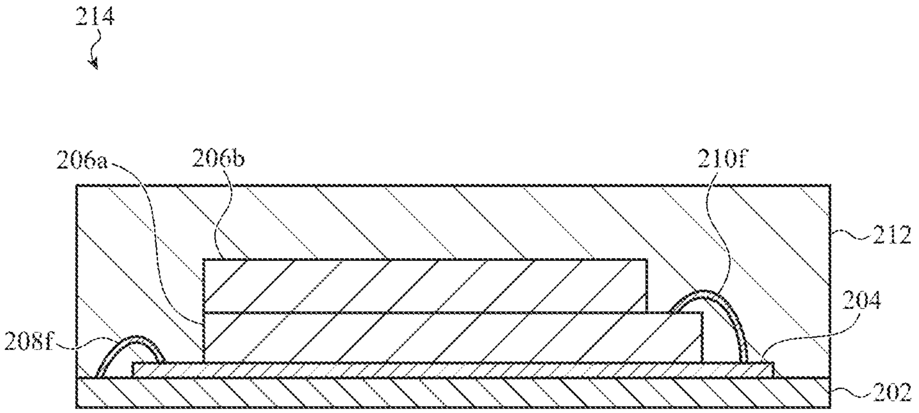
FIG. 2B illustrates a cross-sectional view of the electronic sensor system shown in FIG. 2A, according to an embodiment.

FIGS. 2A-B show two views of an embodiment of an electronic sensor system 200. FIG. 2A is a plan view of the interior of the electronic sensor system 200, whereas FIG. 2B is a cross-sectional view 214 along the cut line A-A' shown in FIG. 2A. As explained in detail below, the electronic sensor system 200 may include a MEMS die (i.e., a MEMS sensor element die) 206*a-b* that, in the embodiment of FIGS. 2A-B, includes the MEMS die 206*a*, in which the mechanical sensing component is located, and the MEMS cap wafer 206*b* bonded to the MEMS die 206*a* to provide a hermetic seal around the mechanical sensing component. In other embodiments, a MEMS die (or module) may contain fewer or more components or structures. The MEMS die 206*a-b* may be directly mounted to an integrated circuit die 204, which is mounted on and electrically connected to a printed circuit board (PCB) 202. The MEMS die 206*a-b*, integrated circuit die 204, and printed circuit board 202 may be encapsulated in a dielectric 212.

FIG. 2A shows a plan view of the interior of the electronic sensor system 200, with the dielectric 212 removed. At the base is a printed circuit board 202 on which the integrated circuit die 204 is mounted. The PCB 202 may have various electrical contacts, not shown, to other components of the electronic sensor system 200, such as power supply lines, input/output (I/O) lines, and the like.

The integrated circuit die 204 may contain various electrical circuit elements (such as voltage regulators, op-amps, comparators, timing circuits, signal generators, discrete electrical components, among others) that may provide control, I/O, and/or an interface with the MEMS die 206*a-b*.

The PCB 202 may have electrical contacts 208*b* and 208*e* that are respectively connected to the electrical contacts 208*a* and 208*d* of the integrated circuit die 204 by the conductors (e.g., wire bonds) 208*c* and 208*f*. Additional such electrical contacts between the PCB 202 and the integrated circuit die 204 may also be present, as well as other or alternative electrical contacts, such as ball bumps, at the interface between the PCB 202 and the integrated circuit die 204. The electrical contacts 208*a-c*, 208*d-f*, and any additional such electrical contacts, may be used to provide power or I/O, or for other uses, between other sections or parts of the electronic sensor system 200 and the integrated circuit die 204 and the MEMS die 206*a-b*.

The MEMS die 206*a-b* may be stacked on top of the integrated circuit die 204. The MEMS die 206*a-b* may be, or include, pressure sensors, accelerometers, rotation sensors, or other types of MEMS. The MEMS die 206*a* may be electrically connected to the integrated circuit die 204 using the electrical contact pad (or electrical contact) 210*a*, the wire bond 210*c*, and the electrical contact (or electrical contact pad) 210*b* on the integrated circuit die 204. The MEMS die 206*a* may also be electrically connected to the integrated circuit die 204 using the electrical contact (or electrical contact pad) 210*d*, the wire bond 210*f*, and the electrical contact (or electrical contact pad) 210*e* on the integrated circuit die 204. Additional such conductive electrical contacts between the MEMS die 206*a* and the integrated circuit die 204 may be present, as shown. The electrical contacts 210*a* and 210*b* and wire bond 210*c* form a conductive path, as do the electrical contacts 210*d* and 210*e* and the wire bond 210*f*.

The electrical contacts 210*a-c* and 210*d-f*, as well as any additional such electrical conductors forming connections between the MEMS die 206*a* and the integrated circuit die 204, may be used to provide power or I/O, or for other uses. Further, as described below, at least one pair of such electrical conductors may be electrically isolated from other electronic components of the MEMS die 206*a*, to be used as a test or "dummy" pair of electrical conductors of the MEMS die 206*a* for measuring a capacitance between the pair of conductors. In the configuration shown, the proximity of the electrical contacts 210*a-c* and 210*d-f* can produce coupling capacitances between adjacent conductors, which may affect the electrical signals routed therethrough.

A dielectric 212 may encapsulate the integrated circuit die 204, the MEMS die 206*a-b*, and the electrical contacts 208*a-f* and 210*a-f*. Though shown as completely encapsulating these components, the dielectric 212 may in some embodiments only partially encapsulate components of the electronic sensor system 200. The dielectric 212 may form an exterior surface of the electronic sensor system 200, or may be internal to an enclosure or package housing the electronic sensor system 200.

Figure 2C:
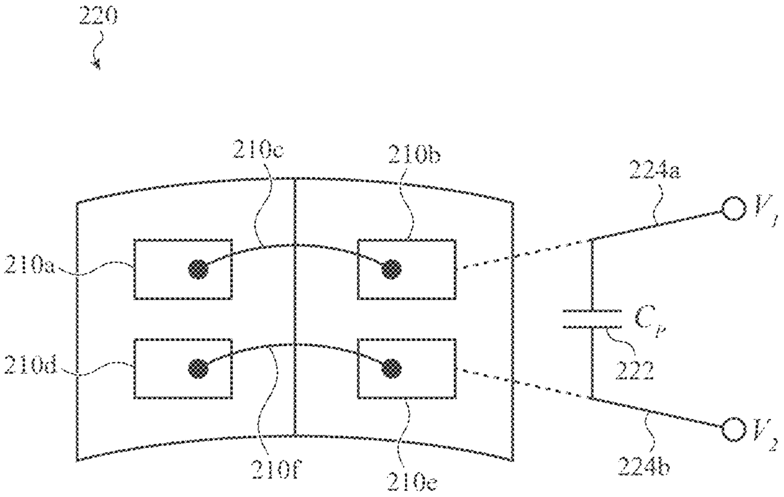
FIG. 2C shows example configurations of two sets of conductors, and an equivalent electrical circuit, forming part of the electronic sensor system shown in FIG. 2A, according to an embodiment.

FIG. 2C shows a detailed top view 220 of the sets of electrical contacts 210*a-c* and 210*d-f*. The sets of connected electrical contacts 210*a-c* and 210*d-f* form the electrodes of the capacitor 222 in the illustrated equivalent electrical circuit between the two voltage levels $V_1$ 224*a* and $V_2$ 224*b*. In effect, the connected electrical contacts 210*a-c* form a first electrode of the capacitor 222 and the connected electrical contacts 210*d-e* form a second electrode of the capacitor 222. The capacitor 222 has capacitance $C_P$. In some embodiments, the voltage $V_1$ 224*a* may be a high level supply voltage, with the MEMS die 206*a* producing, as its output value of its measured physical parameter, an electrical current, such as from the electrical contact 210*d*. In this or other cases, the capacitance of the capacitor 222 may affect the current received into the electrical contact 210*e* of the integrated circuit die 204. If the capacitance of the capacitor 222 is known, sensing and compensating circuits within the integrated circuit die 204 may calculate an adjustment so that the integrated circuit die 204 produces a signal that represents an adjusted (or corrected) value of the measured physical parameter measured by the MEMS die 206*a*. The capacitance of the capacitor 222 may be initially determined through test and/or design considerations prior to manufacture of the electronic sensor system 200. One of ordinary skill in the art will recognize that similar considerations apply if the output signal of the MEMS die 206*a*, at the electrical contact 210*d*, is a voltage.

However, in the field, the capacitance $C_P$ of the capacitor 222 may change from an initially known value, or may not be known initially. One way that a change to the capacitance of the capacitor 222 may occur is by absorption of moisture by the dielectric 212. As the dielectric 212 may at least partially encapsulate the sets of electrical contacts 210*a-c* and 210*d-f*, a change to its dielectric constant, as a result of moisture absorption, may alter the capacitance $C_P$ of the capacitor 222. Another way the capacitance of the capacitor 222 may change is by deformation of the MEMS die 206*a*, such as by shock or bending applied to the PCB 202.

The electronic sensor system 200 may include components or elements by which a change in the capacitance of the capacitor 222 may be inferred and compensation provided. In some embodiments, the integrated circuit die 204 may include a MEMS sensing circuit and an environmental factor compensation circuit. The MEMS sensing circuit may be configured to receive one or more signals from the MEMS die 206*a* and/or provide one or more input signals to the MEMS die 206*a*, such as a drive voltage, an activation signal, or another form of input signal. The MEMS sensing circuit may also be configured to provide a signal to other sections of the electronic sensor system 200, with the value of the physical parameter measured by the MEMS die 206*a*.

To facilitate inference of the capacitance $C_P$ of the capacitor 222 by the environmental factor compensation circuit, some embodiments of the electronic sensor system 200 may include, on a MEMS (e.g., on the MEMS die 206*a*), a second pair of electrical conductors that are electrically isolated from other electrical components of the MEMS die 206*a*. As an example of such embodiments, the electrical contact pads of the second pair of electrical conductors may have the same geometry as the electrical contacts 210*a* and 210*d* of FIG. 2C but may be enclosed within the MEMS die 206*a* in a well of dielectric material, such as $SiO_2$ or another dielectric material. In the case that the second, isolated, pair of electrical conductors has the same geometry and configuration as the first pair of electrical contacts 210*a-c* and 210*d-f*, the environmental factor compensation circuit may then measure the capacitance of the capacitor formed by the second pair of electrical conductors as an estimate for the capacitance $C_P$ of the capacitor 222. In this way, operations of the MEMS die 206*a* and the integrated circuit die 204 need not be suspended to measure the capacitance $C_P$ of the capacitor 222.

In the case that the pair of electrical contacts 210*a-c* and 210*d-f* are not, in usual operation, electrically isolated within the MEMS die 206*a* (e.g., if they serve as an active I/O pair or drive signal input), a second method of measuring the capacitance $C_P$ of the capacitor 222 between the pair of electrical contacts 210*a-c* and 210*d-f* may be implemented by the environmental factor compensation circuit. The environmental factor compensation circuit may be configured to temporarily electrically isolate the electrical contacts 210*a* and 210*d*, and 210*b* and 210*e*, respectively from other circuitry of the MEMS die 206*a* and the integrated circuit die 204 (for example, by temporarily disabling the application of a voltage to the MEMS die 206*a* and/or causing various transistors to function as open circuits). Once the pairs of electrical contacts 210*a-c* and 210*d-f* are electrically isolated, the environmental factor compensation circuit may measure the capacitance $C_P$ of the capacitor 222 by either an active or passive method, as described below in relation to FIGS. 5-7.

Figure 3A:
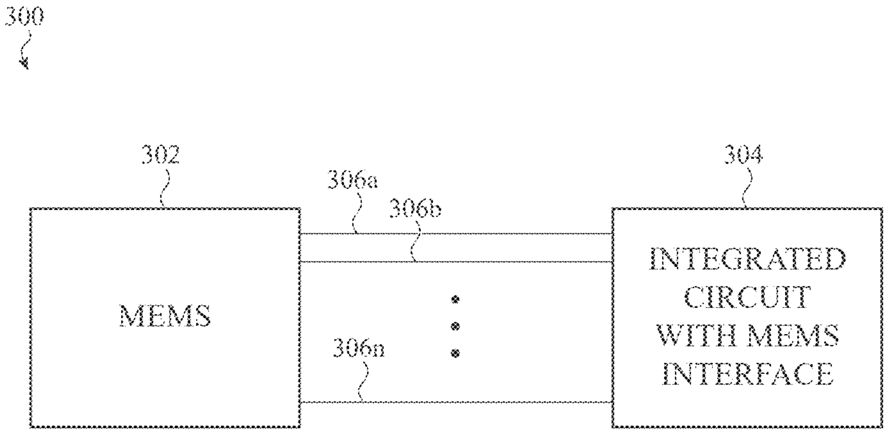
FIG. 3A shows a block diagram of certain components of an electronic sensor system, according to an embodiment.

FIG. 3A is a block diagram 300 of an embodiment of a configuration of two components of an electronic sensor system having at least two electrically connected but separate components: a MEMS 302 (or MEMS die, or MEMS module) in a first package or enclosure, and an integrated circuit 304 in a second package or enclosure (and possibly mounted on a PCB or other substrate). The MEMS 302 may be electrically connected to the integrated circuit 304 by the conductors 306*a-n*, which may include a MEMS controller or interface circuitry. The MEMS controller may provide power or a drive signal to the MEMS 302, and may provide/receive I/O (e.g., control signals and a sensor output) to and from the MEMS 302. The MEMS controller may include a MEMS sensing circuit and an environmental factor compensation circuit as previously described.

Figure 3B:
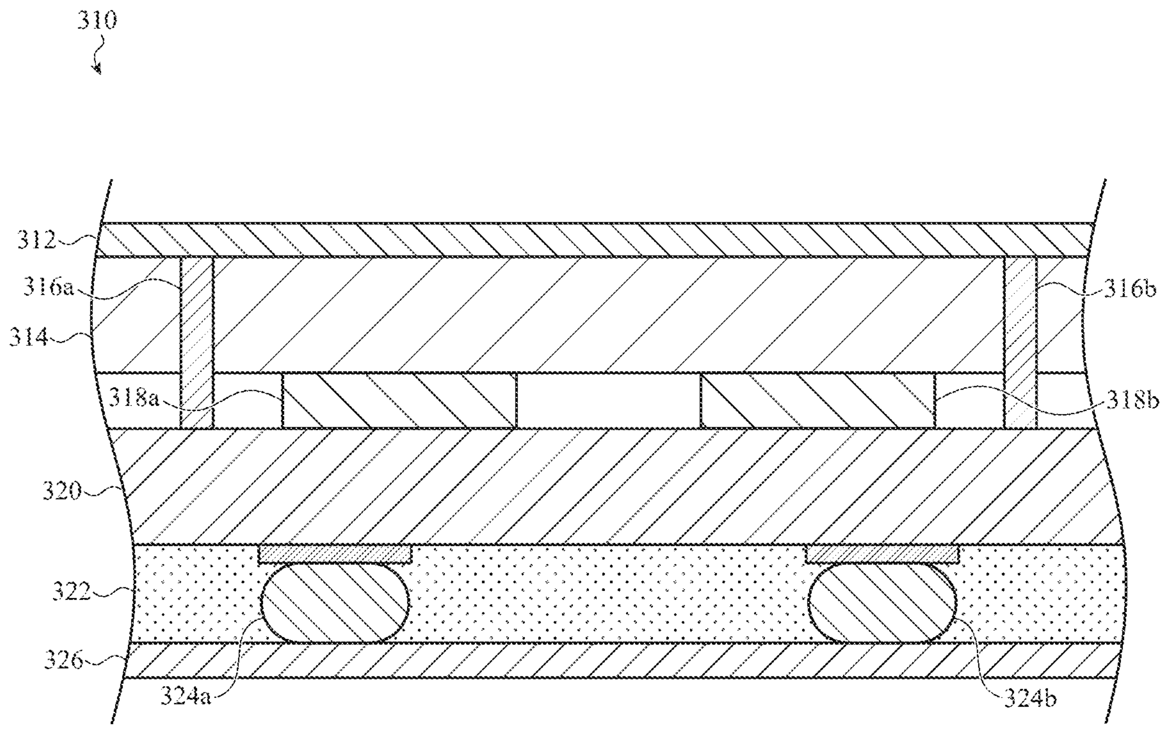
FIG. 3B is a cross-sectional view of a configuration of certain components of an electronic sensor system, according to an embodiment.

FIG. 3B is a cross-sectional view of an embodiment of a section of an electronic sensor system 310 formed using wafer level chip scale package (WLCSP) technologies. In the configuration shown, a MEMS 314 is electrically connected in a stack configuration to an application specific integrated circuit (ASIC) 320. The MEMS 314 may include an accelerometer, a rotation sensor or other type of MEMS. The MEMS 314 has mounted on its top side (in the orientation shown) a humidity sensitive dielectric 312, such as a polyimide. The MEMS 314 may be electrically connected to the ASIC 320 by buried vias 318*a* and 318*b*, and by humidity sensitive vias 316*a* and 316*b*. Though only two of each are shown, embodiments may include additional ones or pairs of each. The ASIC 320 may be mounted to the PCB 326 through conductive ball bumps 324*a* and 324*b*. The number of conductive ball bumps electrically connecting the ASIC 320 to the PCB 326 may differ in various embodiments. The conductive ball bumps 324*a* and 324*b* may be at least partially encapsulated in a humidity sensitive underfill material 322.

The buried vias 318*a* and 318*b*, or the humidity sensitive vias 316*a* and 316*b*, may be formed of conductive materials, and may be in close enough proximity that a coupling capacitance exists between them. The coupling capacitance may be sufficient to affect electrical signals carried between the MEMS 314 and the ASIC 320. The ASIC 320 may therefore include a MEMS controller or interface circuitry, which may in turn include a MEMS sensing circuit and an environmental factor compensation circuit, as previously described. These may be operable to measure and compensate for changes in capacitance between the humidity sensitive vias 316*a* and 316*b*, and/or between the buried vias 318*a* and 318*b*.

Similarly, the ASIC 320 may make use of the environmental factor compensation circuit and circuitry comparable to the MEMS sensing circuit to measure and compensate for changes in capacitance between the conductive ball bumps 324*a* and 324*b*.

Figure 4A:
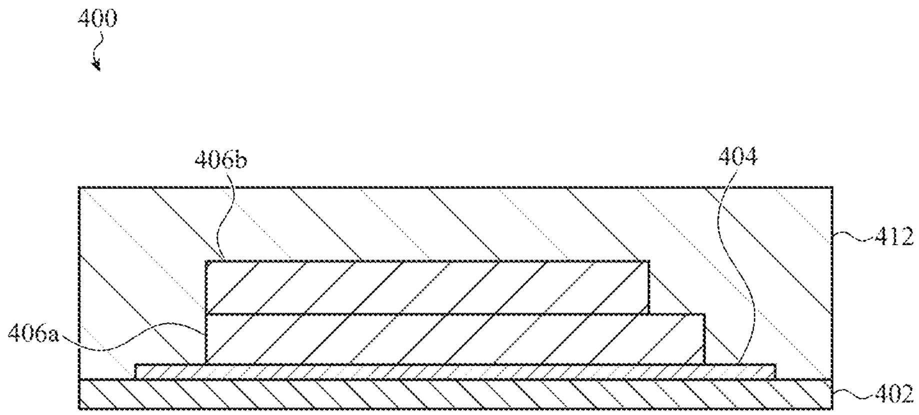
FIG. 4A illustrates a configuration of certain components of an electronic sensor system at an initial time, according to an embodiment.

FIG. 4A is a cross-sectional view of an embodiment of an electronic sensor system 400 that is similar to the electronic sensor system shown in FIG. 2B. FIG. 4A shows an initial configuration of a MEMS die 406*a-b* that includes a MEMS die 406*a* and a MEMS cap wafer 406*b* joined in a stack to the top of an integrated circuit die 404. The integrated circuit die 404 is attached at its bottom surface to the PCB 402. A dielectric 412 may encapsulate the MEMS die 406*a-b* and their connections (not shown), as described with reference to FIGS. 2A-2C.

Figure 4B:
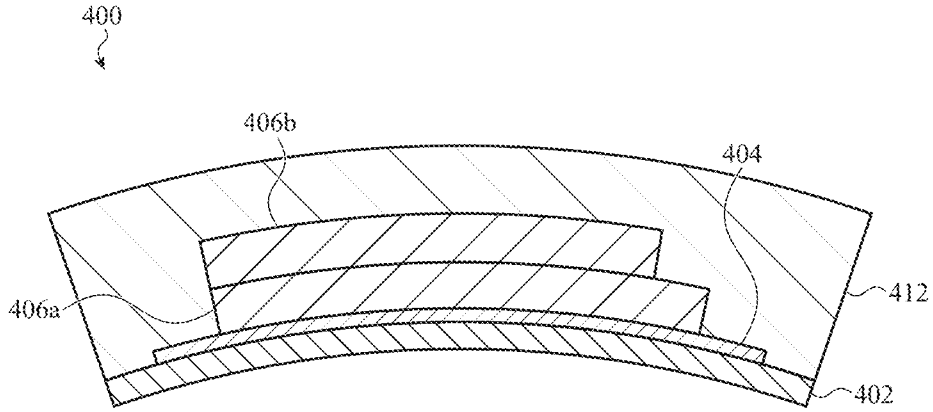
FIG. 4B illustrates an altered configuration of the components of the electronic sensor system of FIG. 4A after an environmentally-induced change.

FIG. 4B shows a cross-sectional view of the electronic sensor system 400, after a bending deformation. The bending deformation may be induced by expansion of the dielectric 412 due to humidity absorption, or by uneven mounting fixtures holding the electronic sensor system 400, or by another cause. The bending deformation may alter the geometry between sets of electrical conductors connecting the MEMS die 406*a-b* and the integrated circuit die 404. The altered geometry and/or a changed dielectric constant of the dielectric 412 may alter a capacitance between two or more of the electrical conductors linking the MEMS die 406*a-b* and the integrated circuit die 404.

Figure 4C:
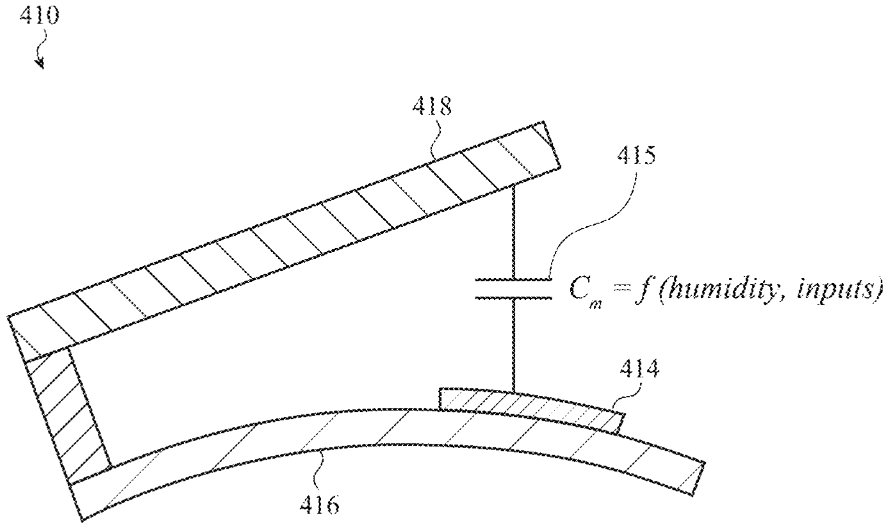
FIG. 4C illustrates an environmentally-dependent capacitance of a MEMS device within the electronic sensor system of FIG. 4B after an environmentally-induced change, according to an embodiment.

FIG. 4C shows a cross-sectional view of a section of a mechanical sensing structure within MEMS device 410. The MEMS device 410 may be a component interior to the MEMS die 406*a-b*. The MEMS device 410 may be an accelerometer or rotation sensor, in some examples, and may include a proof mass 418 cantilevered above a MEMS die substrate 416. A detection electrode 414 may be mounted on the MEMS die substrate 416 to produce a resting capacitance $C_m$ of the capacitor 415 between the proof mass 418 and the detection electrode 414. The capacitance $C_m$ of the capacitor 415 may change in response to either or both of the physical parameter inputs being measured (e.g., acceleration), and the altered geometry due to the deformation, such as may be caused by humidity absorption by the package.

Humidity absorption or other causes may also alter the dielectric constant of material within the capacitor 415 and so alter the capacitance $C_m$.

The bending deformation shown in FIG. 4B may alter a resting capacitance $C_m$ of the capacitor 415 between the proof mass 418 and the detection electrode 414, possibly introducing an erroneous output value from the MEMS device 410. The resting capacitance $C_m$ between the proof mass 418 and the detection electrode 414 may be in parallel to or in series with a capacitance between sets of electrical conductors at the interface of the MEMS device 410 with an associated integrated circuit or ASIC.

The MEMS device 410 may include at least two electrically isolated sets of electrical conductors. As previously described, the capacitance between the sets of isolated electrical conductors may be measured by an environmental factor compensation circuit of the associated integrated circuit or ASIC. Once the capacitance between the sets of isolated electrical conductors is measured, the altered value of the capacitance $C_m$ may be inferred from a measured net capacitance in parallel (or series) with the set of electrical conductors.

Figure 5:
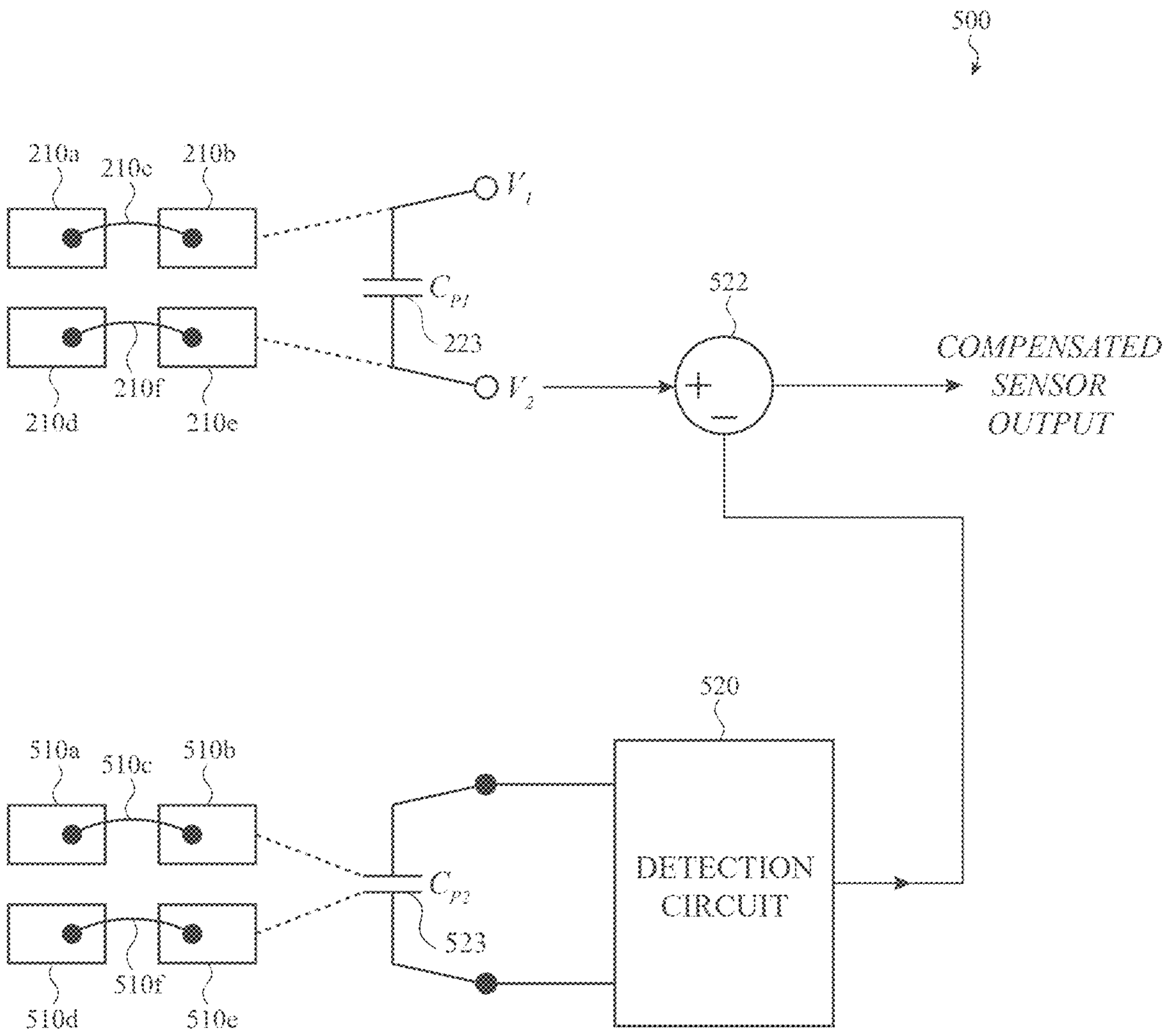
FIG. 5 illustrates a block diagram of components for measuring and inferring capacitances between two sets of conductors of an electronic sensor system, according to an embodiment.

FIG. 5 shows a block diagram 500 of circuitry for measuring and compensating for an altered capacitance at sets of electrical conductors forming the electrical contacts between a MEMS and an integrated circuit. The block diagram 500 may represent the sets of electrical contacts between the MEMS die 206*a* and the integrated circuit die 204 of FIGS. 2A-C, of the electronic sensor system 200, or may represent the sets of electrical contacts between the MEMS 302 and the integrated circuit 304 of FIGS. 3A-B, or may represent electrical contacts between the integrated circuit 304 of FIGS. 3A-B and the substrate connections of FIG. 2A.

The first set of electrical contacts 210*a-f* may be as described in relation to FIG. 2C, with the electrical contact 210*a* of the MEMS die 206*a* linked by the wire bond 210*c* to the electrical contact 210*b* on the integrated circuit die 204, and the electrical contact 210*d* of the MEMS die 206*a* linked by the wire bond 210*f* to the electrical contact 210*e* on the integrated circuit die 204. The connected electrical contacts 210*a-c* form a first electrode and the connected electrical contacts 210*d-f* form a second electrode of the capacitor 223 that has capacitance $C_{P1}$. The capacitance $C_{P1}$ of capacitor 223 may have undergone an environmentally-induced change from an expected capacitance $C_P$ of the capacitor 222 of FIG. 2C. In this embodiment, the set of electrical contacts 210*a-f* are active interconnections by which control, I/O, or supply electrical signals are transmitted between the integrated circuit die 204 and the physical parameter measuring components of the MEMS die 206*a*. The control, I/O, or supply electrical signals to the MEMS from the integrated circuit die 204 may be produced or controlled by a MEMS sensing circuit of the integrated circuit die 204, as previously described. An output signal from the MEMS die 206*a* may be received by the integrated circuit die 204 through electrical contact 210*e*. The output signal of the MEMS die 206*a*, may be a voltage or current output, producing a voltage difference across the capacitor 223. The voltage difference may be affected by the capacitance $C_{P1}$ of the capacitor 223, which may be altered from the expected or designed capacitance $C_P$ of the capacitor 222.

A second set of electrical conductors 510*a-f* may have the same construction as the first set of electrical contacts 210*a-f*. The electrical contacts 510*a* and 510*d* are on the MEMS die 206*a* and have the same configuration as the electrical contacts 210*a* and 210*d*. However, in this embodiment the electrical contacts 510*a* and 510*d* are electrically isolated from the electrically active sections of the MEMS die 206*a*, such as in a dielectric well. The electrical contact 510*a* of the MEMS die 206*a* is linked by the conductive wire 510*c* to the electrical contact 510*b* on the integrated circuit die 204. The electrical contact 510*d* of the MEMS die 206*a* is linked by the conductive wire 510*f* to the electrical contact 510*e* on the integrated circuit die 204. The connected electrical conductors 510*a-c* form a first electrode and the connected electrical conductors 510*d-f* form a second electrode of the capacitor 523 having capacitance $C_{P2}$.

A detection circuit 520 on the integrated circuit die 204 may include or function as an environmental factor compensation circuit, as previously described, to measure the capacitance $C_{P2}$ of the capacitor 523. The capacitance $C_{P2}$ of the capacitor 523 may then be used as an estimate for the capacitance $C_{P1}$ of the capacitor 223. The output of the detection circuit 520 may be a measurement compensation value that is used by the adder 522 to produce a compensated sensor output value (e.g., by adding the measurement compensation value to the output signal from the MEMS die 206*a*). The detection circuit 520 may use a feedback circuit with either a passive process to measure the capacitance $C_{P2}$ of the capacitor 523, in which no generated signals are applied to either electrode of the capacitor 523, or an active process in which the detection circuit 520 does use apply a generated signal. Examples of each process are presented as follows in FIGS. 6 and 7.

Figure 6:
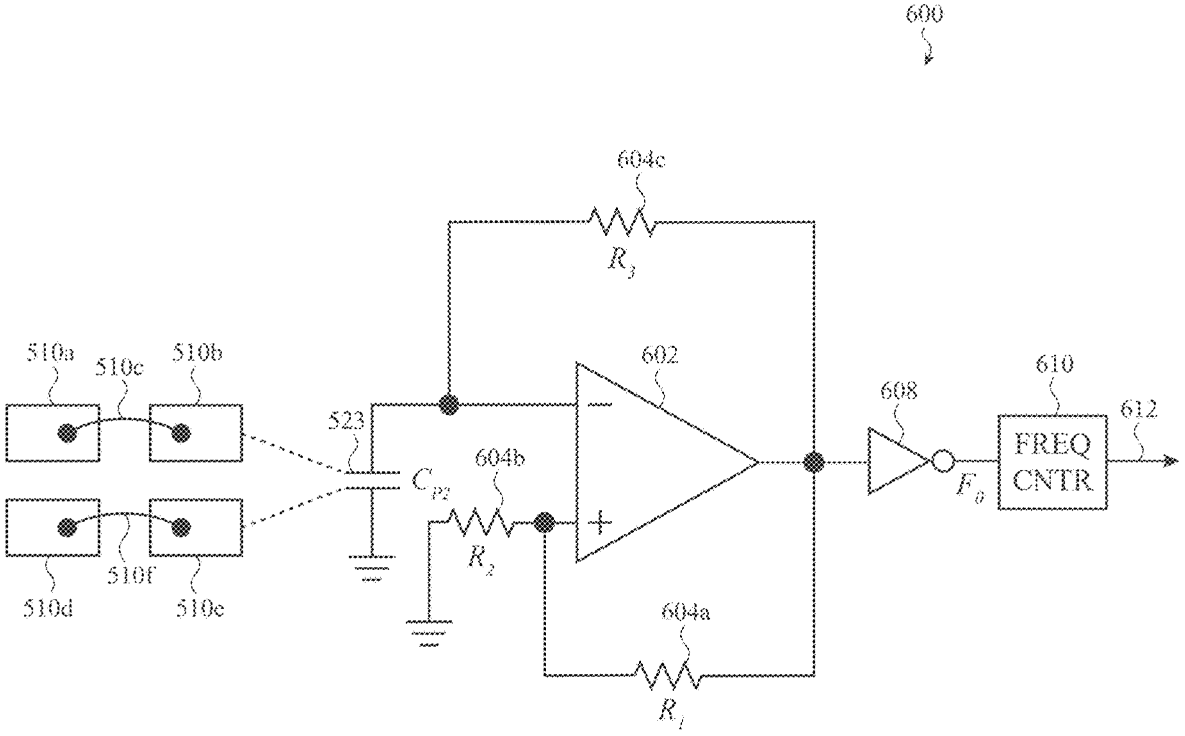
FIG. 6 illustrates a block diagram of components for measuring a capacitance between conductors of an electronic sensor system, according to an embodiment.

FIG. 6 shows a circuit block diagram 600 for components of the detection circuit 520. The capacitor 523 with capacitance $C_{P2}$ may be as described in relation to FIG. 5, and be part of a feedback oscillator circuit that uses an amplifier 602. The resistors $R_1$ 604*a* and $R_2$ 604*b* form a resistor divider circuit to the non-inverting input of amplifier 602, and the capacitor 523 with capacitance $C_{P2}$ and the resistor $R_3$ 604*c* form an integrator. The output of the amplifier 602 may be a square wave with a frequency that is a function of the capacitance of the capacitor 523 with capacitance $C_{P2}$. An inverter 608 in series with a frequency counter 610 can produce an output value 612 from which an estimated capacitance $C_{P2}$ of the capacitor 523 may be calculated. The detection circuit 520 may use an alternative feedback oscillator design.

Figure 7:
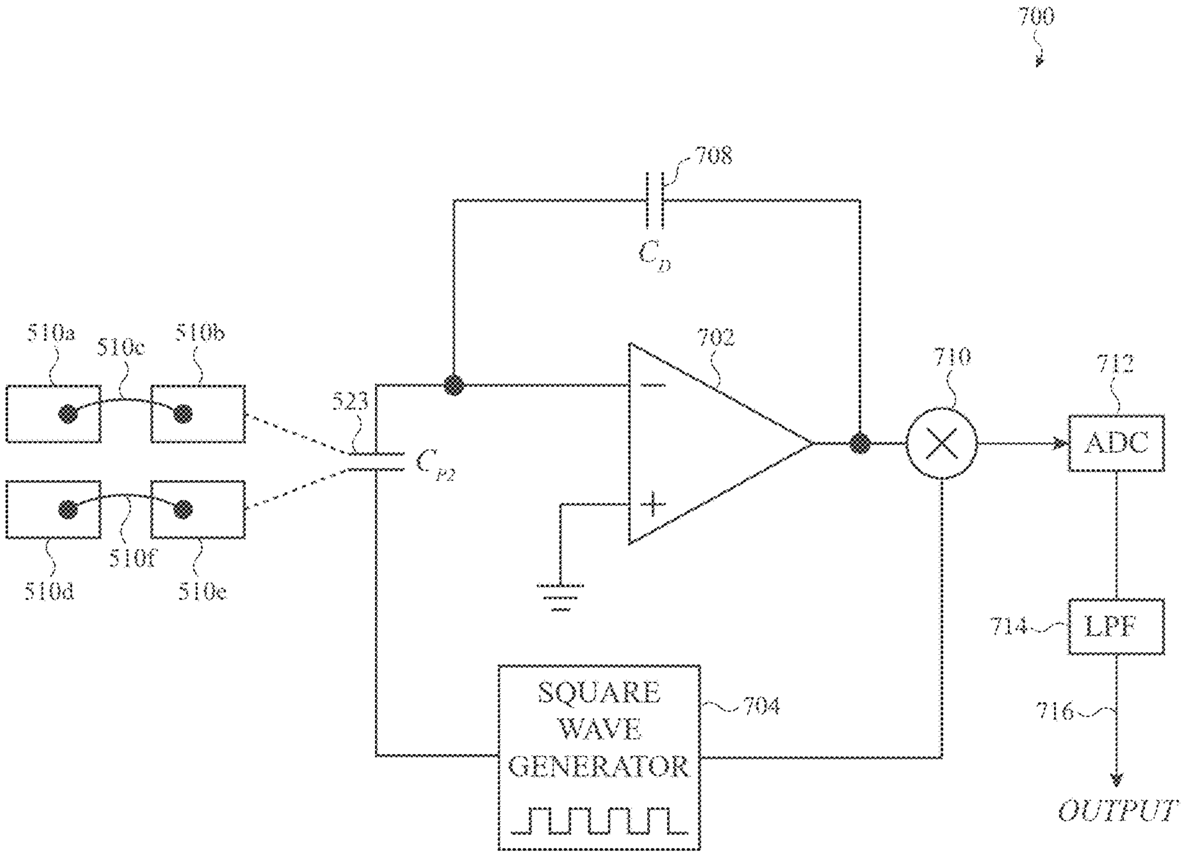
FIG. 7 illustrates a block diagram of components for measuring a capacitance between conductors of an electronic sensor system, according to an embodiment.

FIG. 7 shows a block diagram of components of an active detection circuit 700 that implements the detection circuit 520 of FIG. 5. The active detection circuit 700 uses an alternating current (AC) waveform generator in conjunction with an amplifier 702 to infer the capacitance $C_{P2}$ of the capacitor 523 formed by the sets of electrical conductors 510*a-f* within a MEMS die. In the exemplary case of FIG. 7, the AC wave generator is the square wave generator 704. One skilled in the art will recognize that other AC wave generators producing other AC waveforms (e.g., sinusoidal, triangular, etc.) may be used. The square wave produced by the square wave generator 704 may be applied to a first electrode of the capacitor 523 and to the mixer 710. The output of the amplifier may also be an input to the mixer 710 and to the feedback loop, through the capacitor 708 with capacitance $C_D$, to the second electrode of the capacitor 523. The output of the mixer 710 may be received by an analog-to-digital converter 712 whose output in turn is received by the low pass filter 714. The output 716 of the low pass filter may be a low frequency oscillation with a frequency (or period) given as a function of the capacitance $C_{P2}$ of the capacitor 523.

Figure 8:
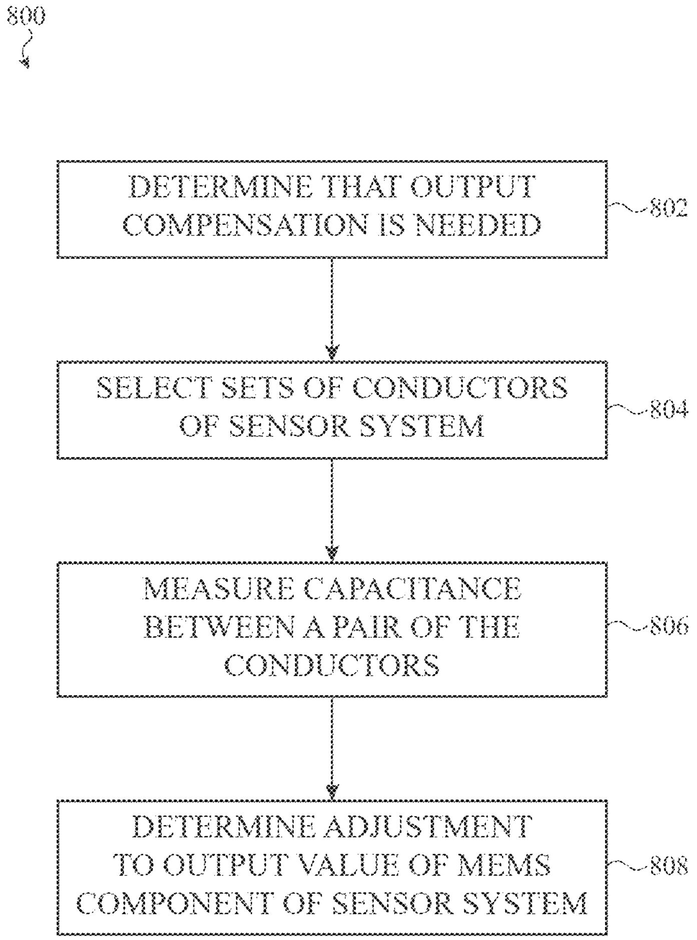
FIG. 8 is a flow chart of a method of compensating for environmentally-induced changes in the operation of an electronic sensor system, according to an embodiment.

FIG. 8 is a flow chart of a method 800 of controlling or using a MEMS component within an electronic sensor system. The method 800 may include compensating or adjusting an output value provided by the MEMS component. The electronic sensor system may include the MEMS component, and the MEMS component may be linked with a MEMS controller provided (i.e., implemented) in an integrated circuit. The MEMS component may have a first set of conductors, and the first set of conductors may be at least partially encapsulated in a dielectric. The MEMS controller may be electrically connected to the MEMS component, within a common enclosure or package of the electronic sensor system, and may be electrically connected to the first set of conductors via a second set of conductors of the MEMS controller. Alternatively, the MEMS controller may be a separate component within an electronic sensor system, that is electrically connected to the MEMS component through the first set of conductors from a second set of conductors of the MEMS controller. The MEMS controller may be implemented within a single integrated circuit within the electronic sensor system. The MEMS component and the first and second sets of conductors may be as described previously in relation to FIGS. 2A-6.

At block 802, the method may include determining that output compensation, or an adjustment of the output value of the MEMS component, may be needed. The determination may be based on any of multiple factors. In some embodiments, the testing may be performed on a periodic basis. In another embodiment, the testing may be performed after the electronic sensor system receives a shock or impulse. In another embodiment, the testing may be performed if the output of the MEMS is determined to be outside of an expected range of values. Other criteria may be used to determine that output compensation should be implemented.

At block 804, a pair of conductors may be selected from the first set of conductors of the MEMS component. As described previously, the selected pair of conductors may be electrically isolated from other components in the MEMS component, or the MEMS controller may electrically isolate a pair of conductors of the first set of conductors to use for the testing.

At block 806, a capacitance between the selected pair of conductors may be measured. Measuring the capacitance may be by passive sensing using a feedback oscillator, as described in relation to FIG. 6, or measuring the capacitance by active sensing, with a signal generator that applies a signal to a feedback oscillator and to the selected pair of conductors.

At block 808, the measured capacitance may be compared to an expected value. A difference from the expected value may indicate that the output value of the MEMS component may not be correct. Using the measured value of the capacitance, an adjustment or compensation value may be determined and applied to the output value of the MEMS component.

The foregoing description, for purposes of explanation, used specific nomenclature to provide a thorough understanding of the described embodiments. However, it will be apparent to a person having ordinary skill in the art that some of the specific details are not required to practice some of the described embodiments. Thus, the foregoing descriptions of specific embodiments are presented for purposes of illustration and description. They are not targeted to be exhaustive or to limit the embodiments to the precise forms described. It will be apparent to a person having ordinary skill in the art that many modifications and variations are possible in view of the above teachings.

What is claimed is:

1. An electronic sensor system, comprising:
- a micro-electromechanical system (MEMS) die;
- an integrated circuit die containing a MEMS sensing circuit and an environmental factor compensation circuit;
- a first set of conductors configured to carry signals from the MEMS die to the MEMS sensing circuit;
- a second set of conductors configured as dummy conductors and having a same construction as the first set of conductors and coupled to the environmental factor compensation circuit; and
- a dielectric at least partially encapsulating the first set of conductors and the second set of conductors; wherein:
  - the environmental factor compensation circuit is configured to measure a capacitance between conductors of the second set of conductors and provide a measurement compensation value to the MEMS sensing circuit.

2. The electronic sensor system of claim 1, wherein:
- the capacitance is a first capacitance measured at a first time;
- the environmental factor compensation circuit is configured to measure a second capacitance between conductors of the second set of conductors at a second time;
- estimate a change in a dielectric constant of the dielectric using the second capacitance;
- determine the measurement compensation value using at least the change in the dielectric constant; and
- apply the measurement compensation value to the first capacitance.

3. The electronic sensor system of claim 1, wherein:
- the MEMS die and the integrated circuit die are enclosed within a single package; and
- the dielectric fully encapsulates the first and second sets of conductors.

4. The electronic sensor system of claim 1, wherein:
- the second set of conductors comprises:
  - a first conductor extending between a first electrical contact on the MEMS die and a first electrical contact on the integrated circuit die; and
  - a second conductor extending between a second electrical contact on the MEMS die and a second electrical contact on the integrated circuit die; and
- the first electrical contact on the MEMS die and the second electrical contact on the MEMS die are electrically isolated from other electrical components of the MEMS die.

5. The electronic sensor system of claim 4, wherein:
- the environmental factor compensation circuit includes a feedback oscillator circuit connected at least to the first electrical contact on the integrated circuit die;
- the measured capacitance is a capacitance between the first conductor and the second conductor; and
- the measured capacitance is based at least in part on a frequency of an output of the feedback oscillator circuit.

6. The electronic sensor system of claim 4, wherein:
- the environmental factor compensation circuit includes:
  - a signal generator that applies a periodic voltage waveform to at least the first electrical contact on the integrated circuit die; and
  - a feedback oscillator circuit connected at least to the second electrical contact on the integrated circuit die; and
- the measured capacitance is based at least in part on an output of the feedback oscillator circuit.

7. The electronic sensor system of claim 1, wherein the MEMS die includes an accelerometer.

8. The electronic sensor system of claim 1, wherein the MEMS die is mounted on the integrated circuit die.

9. An electronic sensor system, comprising:
a micro-electromechanical system (MEMS) module including a pair of conductors at least partially encapsulated in a dielectric, the pair of conductors extending to an exterior surface of the MEMS module, the pair of conductors being dummy conductors;
a MEMS controller electrically connected at least with the pair of conductors and including,
a MEMS sensing circuit operable to apply an input signal to the MEMS module and receive an output signal from the MEMS module; and
an environmental factor compensation circuit configured to measure a capacitance between the pair of conductors; wherein,
the environmental factor compensation circuit is configured to provide a measurement compensation value to the MEMS sensing circuit based on the measured capacitance between the pair of conductors.

10. The electronic sensor system of claim 9, wherein the measurement compensation value is added to the output signal from the MEMS module.

11. The electronic sensor system of claim 9, wherein:
the capacitance is a first capacitance measured at a first time; and
the environmental factor compensation circuit is configured to:
measure a second capacitance between the pair of conductors at a second time;
estimate a change in a dielectric constant of the dielectric using the second capacitance;
determine the measurement compensation value using at least the change in the dielectric constant; and
apply the measurement compensation value to the first capacitance.

12. The electronic sensor system of claim 9, wherein:
the pair of conductors is a first pair of conductors;
the MEMS module includes a second pair of conductors at least partially encapsulated in the dielectric and having a same construction as the first pair of conductors and extending to the exterior surface of the MEMS module;
the first pair of conductors is electrically isolated from other electrical components of the MEMS module; and
the MEMS controller is electrically connected to the second pair of conductors and configured to at least one of:
apply the input signal to the MEMS module through the second pair of conductors; or
receive the output signal from the MEMS module through the second pair of conductors.

13. The electronic sensor system of claim 9, wherein:
the environmental factor compensation circuit includes a feedback oscillator circuit connected to the pair of conductors; and
the measured capacitance is based at least in part on a frequency of an output of the feedback oscillator circuit.

14. The electronic sensor system of claim 9, wherein:
the environmental factor compensation circuit includes:
a signal generator that applies a periodic voltage waveform to a first conductor of the pair of conductors; and
a feedback circuit connected to a second conductor other than the first conductor of the pair of conductors and to the signal generator; and
the measured capacitance is based at least in part on an output of the feedback circuit.

15. The electronic sensor system of claim 9, wherein:
the MEMS module is enclosed in a first package; and
the MEMS controller is enclosed in a second package separate from the first package.

16. A method of controlling an electronic sensor system that includes a micro-electromechanical system (MEMS) having a first set of conductors that is at least partially encapsulated in a dielectric and conductively connected to a second set of conductors of an integrated circuit, the method comprising:
determining that an output value of the MEMS is to be obtained;
selecting a first pair of conductors of the first set of conductors, the first pair of conductors being dummy conductors;
measuring a capacitance between the first pair of conductors using an environmental factor compensation component of the integrated circuit; and
estimating an adjustment value for the output value of the MEMS based at least in part on the measured capacitance.

17. The method of claim 16, wherein the first pair of conductors is electrically isolated from other conductors of the first set of conductors of the MEMS.

18. The method of claim 16, wherein:
the environmental factor compensation component of the integrated circuit measures the capacitance using a least a feedback oscillator circuit.

19. The method of claim 16, further comprising using the environmental factor compensation component to apply a square wave to a first conductor of the first pair of conductors.

* * * * *